(12) United States Patent  
Bouwkamp et al.

(10) Patent No.: US 6,320,718 B1  
(45) Date of Patent: Nov. 20, 2001

(54) DISK DRIVE WITH ZERO READ OFFSET IN RESERVED AREA AND METHOD OF MAKING SAME

(75) Inventors: Timothy D. Bouwkamp; Michael J. Shea, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/227,101

(22) Filed: Jan. 7, 1999

(51) Int. Cl.$^7$ ..................................................... G11B 5/596
(52) U.S. Cl. ...................................... 360/77.04; 360/77.08
(58) Field of Search .................... 360/77.04, 75, 360/77.08

(56) References Cited

U.S. PATENT DOCUMENTS

| | | |
|---|---|---|
| 5,073,833 | 12/1991 | Best et al. . |
| 5,596,463 * | 1/1997 | Hashimoto ..................... 360/77.04 X |
| 5,682,274 * | 10/1997 | Brown et al. ..................... 360/77.04 |
| 5,790,341 | 8/1998 | Cunningham et al. . |
| 5,867,353 * | 2/1999 | Valent ........................... 360/77.04 X |
| 6,078,461 * | 6/2000 | Smith et al. ....................... 360/77.08 |

* cited by examiner

Primary Examiner—David Hudspeth  
Assistant Examiner—James L Habermehl  
(74) Attorney, Agent, or Firm—Milad G Shara

(57) ABSTRACT

A disk drive having a rotary actuator, an embedded servo system for controlling the rotary actuator, a rotating disk surface for recording and reproducing data, and a dual element head supported by the actuator comprising a read element and a write element. The disk surface has a plurality of repeating servo track patterns defining radially spaced-apart servo tracks. The disk surface further includes a user data band having a plurality of radially spaced-apart data tracks for storing user data. Each data track is written with an offset from a corresponding servo track centerline depending on a skew introduced by the dual element head. A reserved band is located outside the user data portion including a reserved data track for storing drive specific data wherein the reserved data track is centrally aligned with a corresponding servo track centerline. The reserved data track can be read reliably by the read element when the servo system is tracking on the servo track centerline. A method for making the disk drive includes writing the reserved data track in central alignment with a corresponding servo track centerline.

13 Claims, 7 Drawing Sheets

DISK DRIVE WITH ZERO READ OFFSET IN RESERVED AREA AND METHOD OF MAKING SAME

BACKGROUND OF THE INVENTION

1. Field of the Invention

The present invention relates to a disk drive and method of manufacturing a disk drive having data sectors written with a compensating offset in the reserved band of the disk surface for improving disk drive performance during initialization.

2. Description of the Prior Art

Hard disk drives store large volumes of data on one or more disks mounted on a spindle assembly. The spindle assembly includes a spindle motor for rotating the disks at a substantially constant angular velocity. Disk drives employ a disk control system for interfacing between a host (e.g., a computer) and the disks to read and write data. Each disk may store data on up to two disk surfaces. On each disk surface, user data is stored in concentric circular tracks (i.e., data tracks) between an outside diameter and an inside diameter of the disk. Servo systems are employed to maintain alignment of a transducer head with a desired target data track (termed "track following"), for reading and writing user data on the disk surface within desired control parameters.

Most current disk drives use embedded servo systems to store servo data on the same disk surface as user data to provide control signals and information employed in the operation of the servo system. User data on each track is divided into data sectors. Embedded servo information is recorded in equally spaced apart servo sectors placed between data regions containing data sectors. For example, a concentric data track may include 60 servo sectors interspersed between data regions. The circular path described by the information in the servo sectors may be termed a servo track.

Each disk surface can be divided into a user data band (or user data area) and a reserved band (or reserved area). The user data band includes the data tracks which are allocated for storing user data on the disk surface. The reserved band is located outside the user data band, and typically comprises a small number of data tracks (e.g., 1 to 20 data tracks) on each disk surface. The reserved band on the disk surface is utilized for storing extensive drive specific data or "optimization" data. The drive specific or optimization data is measured during manufacturing or testing of the disk drive and stored in the reserved band on the disk surface. At power-up, the drive uses a set of default parameters to start operations and reads the optimization data to "tune" the drive for optimum performance. Such parameters may include read channel settings and individual head characteristics including measured read/write head offset.

Presently, disk drives use a dual element transducer head where a magnetoresistive (MR) head is used for reading and a thin film inductive head is used for writing. Inevitably, some offset or skew exists between the two heads due to manufacturing variances such that when the read head is positioned at a given point over the track, the write head is off-track from the read head by some amount. In one known application, when data is written on the disk surface in both the user data band and the reserved data band, the read element is centered on the corresponding servo track. Data is written with an offset from the centerline of the corresponding servo track based on the skew introduced by the dual element head. For subsequent reading of a data track (or reserved data track), the read element is moved off-track from the corresponding servo track center line by the offset amount (termed a "micro-jog") such that the read element is substantially centered over the data track. This results in track following of the corresponding servo track at an offset from the servo track center line during execution of a read command.

In another known application, the micro-jog process can be reversed—that is, the read element can be offset from the servo track centerline to place the write element at the centerline. In this case, track following for a read command will occur at the servo track centerline at each track on the disk. Unfortunately, when track following for the write command at the offset position, the read head may be operating in a less linear region and servo tracking errors may occur which exceed a track mis-registration budget allowed for the servo controller.

The amount of offset varies from transducer head to transducer head and especially between different transducer head manufacturers. As a result of this variance, the offset is measured in manufacturing for each transducer head and saved in the reserved band of the disk surface. One problem is that the disk drive does not know what the offset is at power-up. Accordingly, when a disk drive is powered up, a default offset (in addition to other error recovery steps) is used to read optimization data, including the measured offset information, in the reserved band. The measured offset is subsequently stored in volatile memory for use in reading data stored in the user data band on the disk surface.

Since offsets vary from transducer head to transducer head, it is difficult or virtually impossible to determine a default offset which is suitable for all transducer heads. Further, with decreasing track pitch causing the offset to be more significant, the default offsets may be unsuitable for reading any data from the disk surface. In this case, the disk drive is forced to perform extensive retries and error recovery to find an offset which permits the reserved area to be read for each head and disk surface combination. The number of head and disk surface combinations could be 16 or more in a high capacity drive, therefore the start-up time of a drive may be detrimentally extended. A need exists therefore to improve the performance of a disk drive during start-up when reading optimization data in a reserved area.

SUMMARY OF THE INVENTION

The present invention provides a disk drive and method of manufacturing a disk drive having a disk surface with zero read offset in the reserved band of the disk surface for improving disk drive performance at initialization.

In one embodiment, the present invention provides a disk drive having a rotary actuator, an embedded servo system for controlling the rotary actuator, a rotating disk surface for recording and reproducing data, and a dual element head supported by the rotary actuator comprising a read element and a write element. The disk surface has a plurality of repeating servo track patterns defining radially spaced-apart servo tracks. The disk surface further includes a user data band having a plurality of radially spaced-apart data tracks for storing user data. Each data track is written with an offset from a corresponding servo track centerline depending on a skew introduced by the dual element head. A reserved band is located outside the user data band including a reserved data track for storing drive specific data wherein the reserved data track is centrally aligned with a corresponding servo track centerline. The reserved data track can be read reliably by the read element when the servo system is tracking on the servo track centerline.

The disk surface may further comprise a buffer zone between the reserved band and the user data band. In one aspect, the buffer zone comprises at least one data track.

In one embodiment, the drive specific data is stored at more than one location within the reserved data band. The servo track includes a servo pattern having a first servo burst and a second servo burst, wherein the corresponding servo track centerline is defined by the juncture of the first servo burst and the second servo burst.

The offset is measured during manufacturing and stored in the reserved band. The disk drive further includes means for employing the offset stored in the reserved band to center the read element on the data track in the user data band during execution of a read command. The offset may vary with the location of the data track in the user data band.

In another embodiment, the present invention provides a method for making a disk drive having a rotary actuator, an embedded servo system for controlling the rotary actuator, a rotating disk surface for recorded and reproducing data, in a dual element head supported by the actuator. The dual element head includes a read element and a write element. The method includes a step of formatting the disk surface to have a plurality of repeating servo track patterns defining radially spaced-apart servo tracks. The step of formatting the disk surface further includes measuring drive specific data, the drive specific data including a skew value introduced by the dual element head. A user data band is defined having a plurality of radially spaced-apart data tracks for storing user data. Each data track is written with an offset from a corresponding servo tracks centerline depending on the skew value. A reserved band is defined, the reserve band being located outside the user data band. The reserved band includes a reserved data track for storing drives specific data. The reserved data track is written in central alignment with a corresponding servo track centerline.

The step of writing the reserved data track centrally aligned with a corresponding servo track centerline includes the step of employing the skew value to offset the read element from the corresponding servo track centerline such that the write element is centered on the corresponding servo track center line. The step of formatting the disk surface further includes the step of defining a buffer zone between the reserved band and the user data bands. In one aspect, the step of defining the buffer zone includes the step of providing at least one data track space between the reserved band and the user data band.

In one aspect, the step of writing the reserved data track further includes the step of writing the drive specific data at more than one location within the reserved band. The servo track includes a servo pattern having a first servo burst and a second servo burst, wherein the step of formatting the disk surface further includes the step of defining the corresponding servo track center line by the juncture of the first servo burst and the second servo burst. In one aspect, the offset varies with the location of the data track in the user data band.

BRIEF DESCRIPTION OF THE DRAWINGS

The accompanying drawings are included to provide a further understanding of the present invention and are incorporated in and constitute a part of this specification. The drawings illustrate embodiments of the present invention and, together with the description, serve to explain the principles of the invention. Within the drawings, like numbers designate like elements.

DETAILED DESCRIPTION

Figure 1:
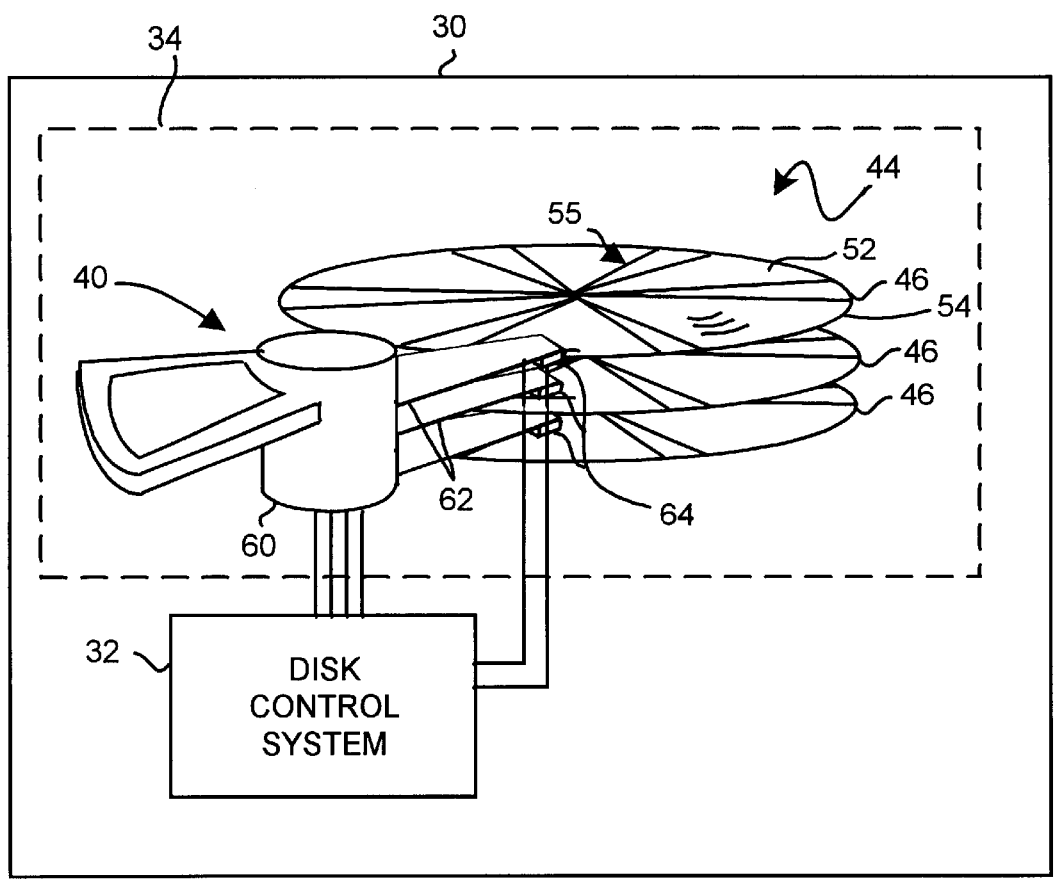
FIG. 1 illustrates one embodiment of a hard disk drive system having a disk surface with zero read offset in the reserved area, in accordance with the present invention.

A hard disk drive according to the present invention is illustrated generally at 30 in FIG. 1. Disk drive 30 includes a disk surface having zero read offset in the reserved band of the disk surface for improving disk drive performance at initialization.

Disk drive 30 includes a disk control system 32 (e.g., a controller PCBA) and a head disk assembly (HDA) 34. Disk control system 32 includes circuitry and processors which provide an intelligent disk control system interface between a host system (not shown) and HDA 34 for execution of read and write commands. The host system can include a microprocessor based data processing system such as a personal computer, or other system capable of performing a sequence of logical operations. Further, disk control system 32 includes an embedded servo system for controlling the HDA 34. Disk control system 32 can be similar to disk control systems known to those skilled in the art.

HDA 34 includes a rotary actuator assembly 40 and a disk assembly 44. Disk assembly 44 includes one or more magnetic media disks, such as indicated at 46. Disks 46 are stacked on a spindle assembly (not shown) for rotating disks 46 at a high rate of speed. Each disk 46 includes up to two disk recording surfaces (i.e., disk surfaces) capable of storing data thereon, such as indicated at 52 and 54. Each disk surface has a plurality of repeating servo track patterns defining radially spaced-apart servo tracks, generally indicated at 55.

Rotary actuator assembly 40 includes a voice coil motor (VCM) 60 and multiple actuator arms 62 extending from VCM 60. Each actuator arm 62 corresponds to one or more respective disk surfaces, such as disk surface 52. One or two transducer heads 64 are disposed at the end of each actuator arm 62 and each transducer head 64 is associated with a corresponding disk surface such as 52, 54. In one preferred embodiment, transducer head 64 is a dual element transducer head, which is described in further detail later in the specification. Each disk surface includes a user data band and a reserved band (shown in FIG. 2), wherein a written data track in the reserved band is centered in approximate alignment with the corresponding servo track centerline. The unique formatting of each disk surface and its relationship with a corresponding transducer head 64 is detailed in this specification.

Figure 2:
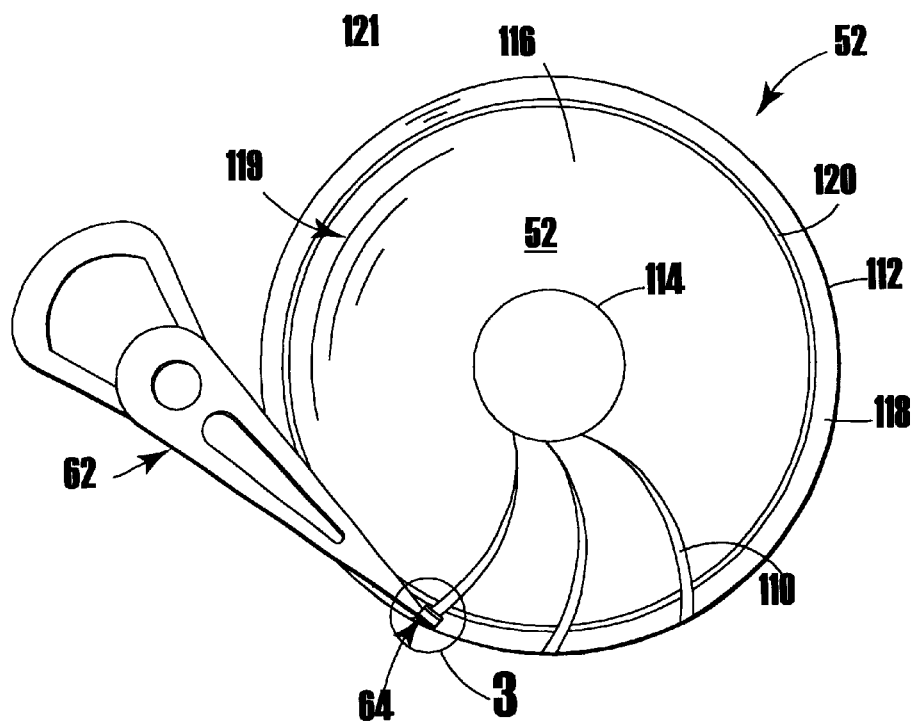
FIG. 2 is a plan view illustrating one embodiment of a disk surface, and the relationship between a rotary actuator and the disk surface, in accordance with the present invention.

FIG. 2 is a partial plan view of a disk surface (shown as disk surface 52) in accordance with the present invention. The relationship between the rotary actuator assembly and the disk surface is shown. Transducer head 64 is supported by rotary actuator arm 62, and disposed over disk surface 52. Disk surface 52 includes a plurality of repeating servo track patterns defining radially spaced-apart servo tracks, indicated at 110 (three shown). The servo tracks 110 are written to the disk surface during manufacturing using a servo writing process which can be similar to servo writing processes known to those skilled in the art. In particular, servo tracks 110 are written to the disk surface 52 via transducer head 64. As the rotary actuator arm 62 is rotated by a positioning system, the transducer head 64 is incrementally moved in an arcuate path between an outer diameter 112 and an inner diameter 114 of the disk surface 52. The primary arc of the arcuate path is determined by the transducer head 64, the rotary actuator arm 62 and its associated pivot point.

Disk surface 52 includes a user data band 116 (or user data area) and a reserved band 118 (or reserved area). The user data band 116 includes a plurality of user data tracks 119 (partially shown) on the disk surface 52. The reserved band 118 is located outside the user data band 116, and typically comprises a number of "reserved"—i.e. not available to a user—data tracks, partially indicated at 121. The user data band 116 on disk surface 52 is utilized for storing user data during operation of the disk drive 30. The reserved band 118 on the disk surface 52 is utilized for storing drive specific data or "optimization" data. The drive specific or optimization data is measured during manufacturing or testing of the disk drive, and stored in the reserved band 118 on the disk surface 52. The optimization data is subsequently used to optimize disk drive performance during operation of the disk drive.

A buffer zone 120 is located between user data band 116 and reserved band 118. Buffer zone 120 provides a buffer area between user data band 116 and reserved band 118 which allows an increased track spacing error margin for writing a data track in the reserved band 118 which is adjacent to the user data band 116. In one exemplary embodiment, buffer zone 120 comprises one or more "blank" data tracks.

Figure 3:
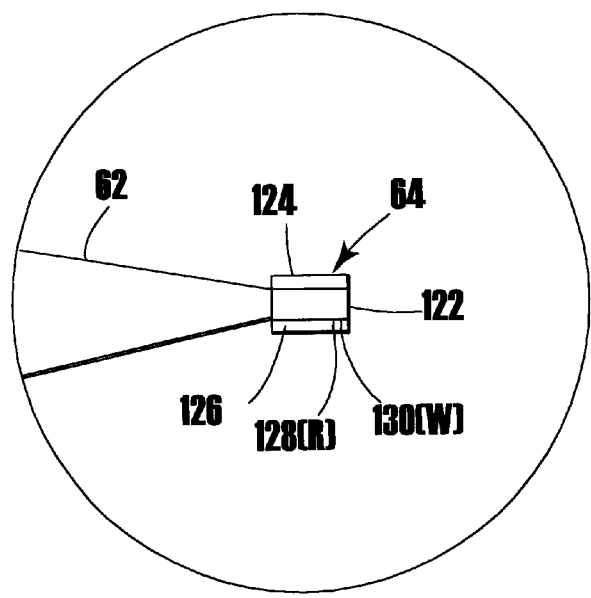
FIG. 3 is an enlarged plan view illustrating one embodiment of a dual element transducer head.

In reference also to FIG. 3, an enlarged partial plan view of a conventional transducer head 64 positioned on rotary actuator arm 62 is illustrated. Transducer head 64 is a "dual-element" transducer head and as such, includes a separate read element (or transducer) and write element (or transducer) located thereon. In particular, transducer head 64 includes slider 122 having first air bearing 124 and second air bearing 126. Operably located on second air bearing 126 is a read element 128(R) and a write element 130(W). In one exemplary embodiment, read element 128(R) is a magnetoresistive (MR) head. In another exemplary embodiment, dual element head 64 is a giant magnetoresistive (GMR) head. The read element 128(R) and write element 130(W) are susceptible to being offset from one another as is common to dual element heads.

In accordance with commonly practiced methods when user data tracks are written on disk surface 52, a skewed or offset relationship exists between servo tracks and data tracks in the user data band owing to the aforementioned read and write element offset. This occurs when the read element 128(R) is centered over a servo track for optimum track following during writing. The write element 130(W) then writes data sectors which are offset from the servo track center according to the offset relationship of the read and write elements 128(R), 130(W).

The invention uses a different writing process for writing data tracks in the reserved band. During manufacturing of the disk drive where each of the head offsets are known, the read element is offset from the servo track centerline by an amount sufficient to compensate for the head offset. The written data track will then be approximately in centered alignment with the servo track centerline. Accordingly, when a reserved area data track is read during a subsequent power-up sequence, the servo controller need not take head offset into account. In effect, a "zero offset" parameter may be applied with a high probability of an error free read. The following paragraphs describe in more detail the relationship between servo tracks and data tracks in the user data band and the reserved data band during reading and writing on the disk surface for optimized performance of disk drive 30.

Figure 4:
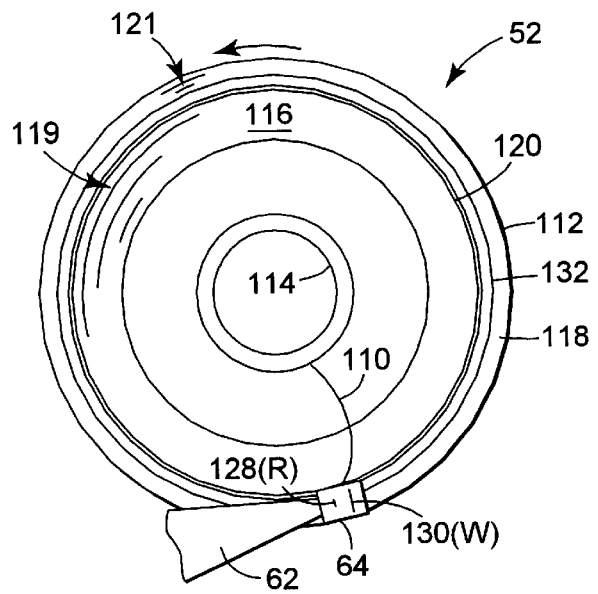
FIG. 4 is a diagram illustrating one embodiment of a disk drive wherein a dual element transducer head is positioned over a reserved band on a disk surface for writing a reserved data track, in accordance with the present invention.

In FIG. 4, one exemplary embodiment of disk drive 30 is partially shown wherein the dual element head 64 is positioned over the reserved band 118 on disk surface 52 for writing a reserved data track, in accordance with the present invention. Write element 130(W) is centered over a corresponding servo track centerline of reserved data track 132 before writing drive specific data to reserve data track 132, substantially aligned with the corresponding servo track centerline. In one preferred embodiment, drive specific data measured during manufacturing and testing of disk drive 30 is written twice to the disk surface 52 in the reserved band 118.

Figure 5:
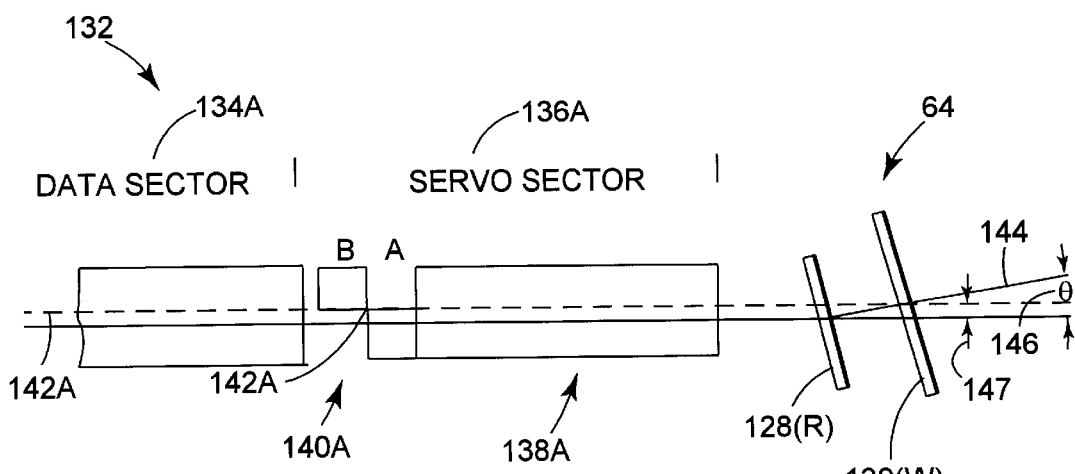
FIG. 5 is an enlarged diagram illustrating one embodiment of the relationship between a dual element transducer head and a reserved data track during the writing of drive specific data in the reserved band on a disk surface.

In FIG. 5, an enlarged partial diagram illustrating one exemplary embodiment of reserved data track 132 with its relationship to transducer head 64 during writing of drive specific data to the reserved data track 132 is shown. In particular, reserved data track 132 includes data sector 134A and servo sector 136A. Servo sector 136A includes fields containing track identification used in track seeking operations and track information used in track following operations. In one exemplary embodiment shown, servo sector 136A includes first portion 138A and second portion 140A. First portion 138A includes tracking information including automatic gain control (AGC) and phase lock oscillator information (PLO), timing information (e.g., a servo sync word) and track number or address and sector number information. Second portion 140A includes servo burst information for positioning (i.e., centering) transducer head 64 over reserved data track 132. In the exemplary embodiment shown, servo sector 136A includes servo burst A and servo burst B and the servo track centerline 142A is defined by the junction of servo burst A and servo burst B. Those skilled in the art will know that it is conventional to provide repeating patterns of 4 or more servo bursts to provide a positioning reference where an A/B burst junction or a C/D burst junction may define the servo track centerline. Transducer head 64 is shown positioned over reserved data track 132. The centerline of read element of 128(R) and write element 130(W) is indicated at 144, resulting in a corresponding skew angle theta (indicated at 146). The skew angle is variable between the inner and outer diameters causing the relative offset between the read and write elements to vary accordingly.

Drive specific data is written to reserved data track 132 during manufacturing. The drive specific data includes the offset introduced by the dual element head. Write element 130(W) is centered on the servo track centerline 142A of servo sector 136A resulting in data written to data sector 134A being centered on the corresponding servo track centerline 142A. During manufacturing and testing of disk drive 30, drive specific data is measured, including an offset value introduced by the dual element head 64. An offset is then determined using the skew value introduced by the dual element head. In particular, when data is written to reserved data track 132 during manufacturing, read element 128(R) is offset (termed a "micro-jog") from centerline 142A by the determined offset, indicated at 147, in order to center write element 130(W) on servo tracks centerline 142A. Accordingly, the reserved data track 132 is written substantially aligned with the corresponding servo track underline 142A, such that the reserved data track 132 can be reliably read by the read element when the servo system is tracking on the servo track centerline 142A during disk drive initialization at power-up.

Figure 6:
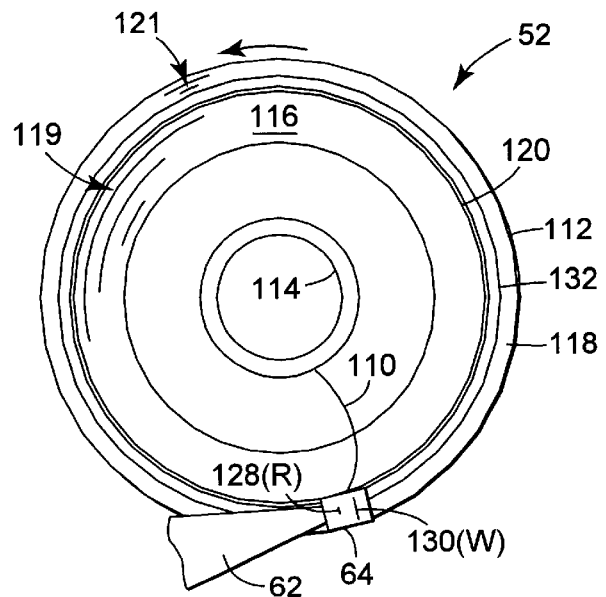
FIG. 6 is a diagram illustrating one embodiment of a disk drive wherein a dual element transducer head is positioned over a reserved band on a disk surface for reading data, in accordance with the present invention.

In FIG. 6, one exemplary embodiment of disk drive 30 is partially shown wherein the dual element head 64 is positioned over the reserved band 118 on disk surface 52 for reading data, in accordance with the present invention. Since the reserved data track 132 is written substantially aligned with the corresponding servo track centerline, read element 128(R) is centered over reserved data track 132. Accordingly, when the reserved data track 132 is read during a subsequent power-up sequence, the disk control system 32 need not take head offset into account, providing for a high probability of an error free read during disk drive initialization.

Figure 7:
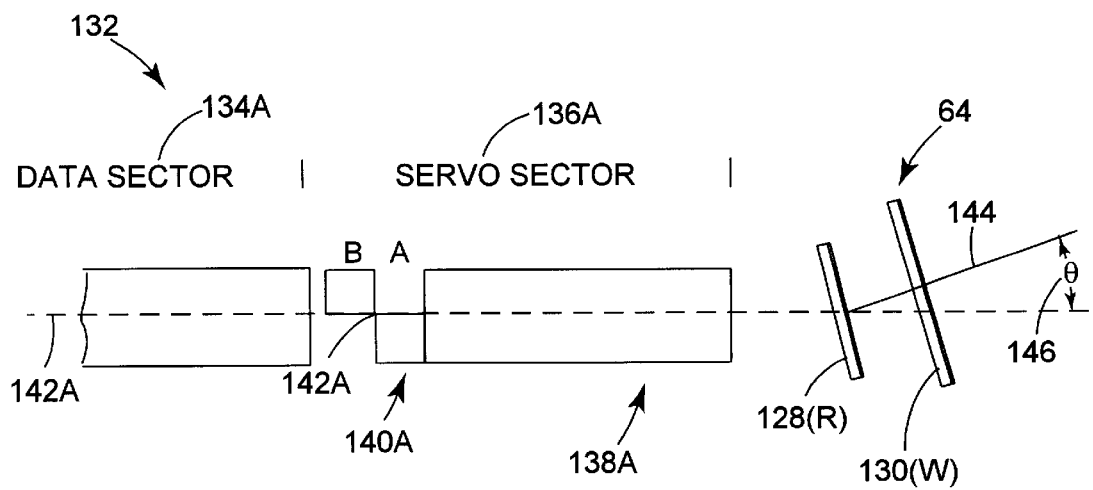
FIG. 7 is an enlarged diagram illustrating one embodiment of the relationship between a dual element transducer head and a reserved data track during the reading of data in the reserved band on a disk surface.

In FIG. 7, an enlarged partial diagram illustrating one exemplary embodiment of reading reserved data track 132 with its relationship to transducer head 64. Since data sector 134A is substantially centered on the center line 142A of servo sector 136A, the use of a "default offset" and other data recovery techniques are unnecessary for accessing the measured offset information stored in reserved band 118. Accordingly, there is a high probability that the drive specific data will be reliably read without error during disk drive initalization.

Figure 8:
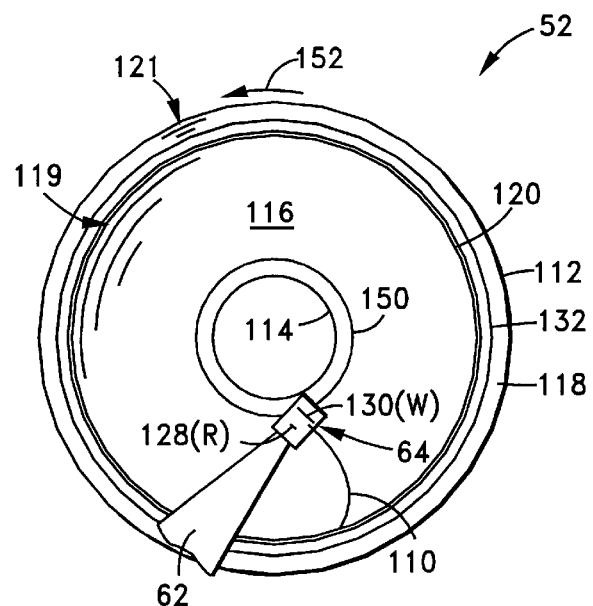
FIG. 8 is a diagram illustrating one embodiment of a disk drive wherein a dual element transducer head is positioned over a user data track for execution of a write command in accordance with the present invention.

FIG. 8 is a diagram illustrating one exemplary embodiment of disk drive 30 wherein the transducer head 64 is positioned over a user data track 150 in the user data band 116 on disk surface 52 for execution of a write command to write user data. When data is written to user data track 150 in the user data band 116, read element 128(R) is centered on the corresponding servo track to obtain optimum track following performance.

Figure 9:
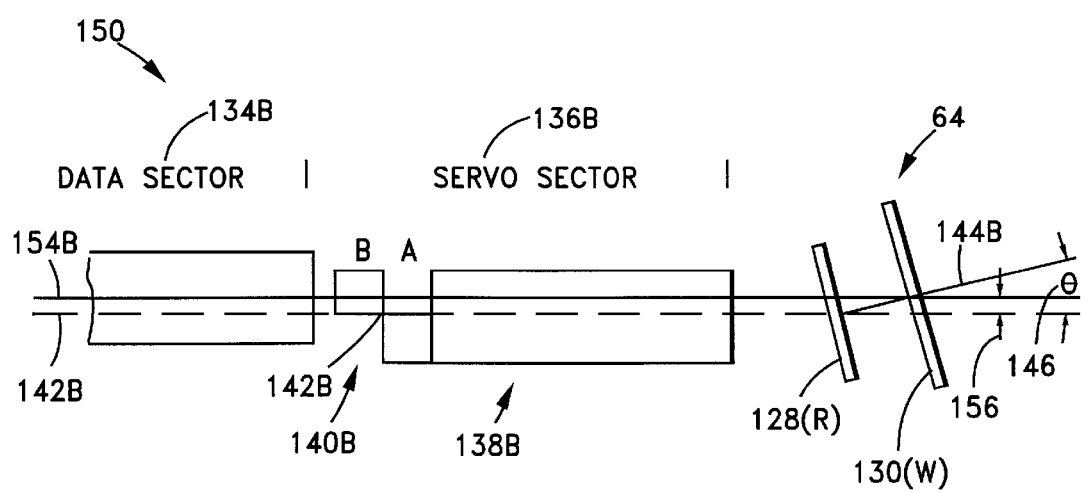
FIG. 9 is an enlarged diagram illustrating one embodiment of the relationship between a dual element transducer head and a data track during the writing of data in a user data band on a disk surface.

FIG. 9 is an enlarged diagram illustrating one embodiment of the relationship between the dual element transducer head 64 and data track 150 during the writing of data in the user data band 116 on disk surface 52. Data track 150 is similar to reserved data track 132 previously described herein, and accordingly like element numbers are used with the substitution of a "B" for the letter "A". In the exemplary embodiment shown, the centerline of servo sector 136B, including first and second portions 138B and 140B respectively, is defined by the juncture of servo burst A and servo burst B, indicated at 142B. As disk surface 52 rotates below transducer head 64, indicated by arrow 152, read element 128R is centered on the servo track centerline 142B to obtain the optimum track following performance for disk drive 30. Accordingly, when data is written to data track 150, the data is written with an offset from the corresponding servo track centerline 142B. The value of the offset depends on the skew introduced by the dual element transducer head 64, and the associated position of rotary actuator arm 62 and its pivot point.

In particular, the data track centerline is indicated at 154B. The difference between servo track centerline 142B and the data track centerline 154B is offset 156. The value of offset 156 is dependent upon the physical characteristics of dual element transducer head 64, (e.g., spacing and alignment between read element 128(R) and write element 130(W), rotary actuator 62 and the position of transducer head 64 along the arcuate path as defined by servo track 110 (i.e., skew angle 146 changes as transducer head 64 moves between outer diameter 112 and inner diameter 114). The value of offset 156 is determined during testing of the disk drive 30 in the manufacturing process as previously stated herein.

Figure 10:
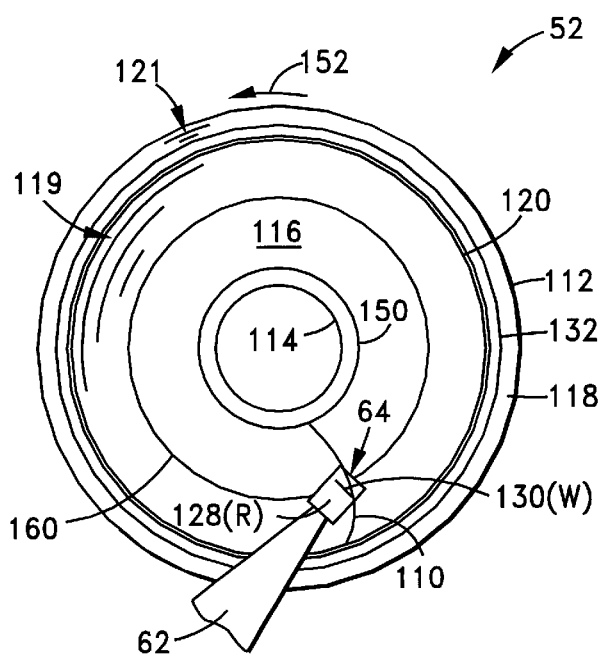
FIG. 10 is a diagram illustrating one embodiment of a disk drive wherein a dual element transducer head is positioned over the user data band on a disk surface for execution of a read command, in accordance with the present invention.

FIG. 10 illustrates one embodiment of disk drive 30 wherein the dual element transducer head 64 is positioned within the user data band 116 on disk surface 52 for execution of a read command. Transducer head 64 is shown positioned over data track 160. During the reading of data track 160, read element 128(R) is centered on the data track 160 to minimize errors in reading data from the disk surface 52. Accordingly, read element 128(R) is offset or micro-jogged from the corresponding servo track centerline by the previously determined offset amount.

Figure 11:
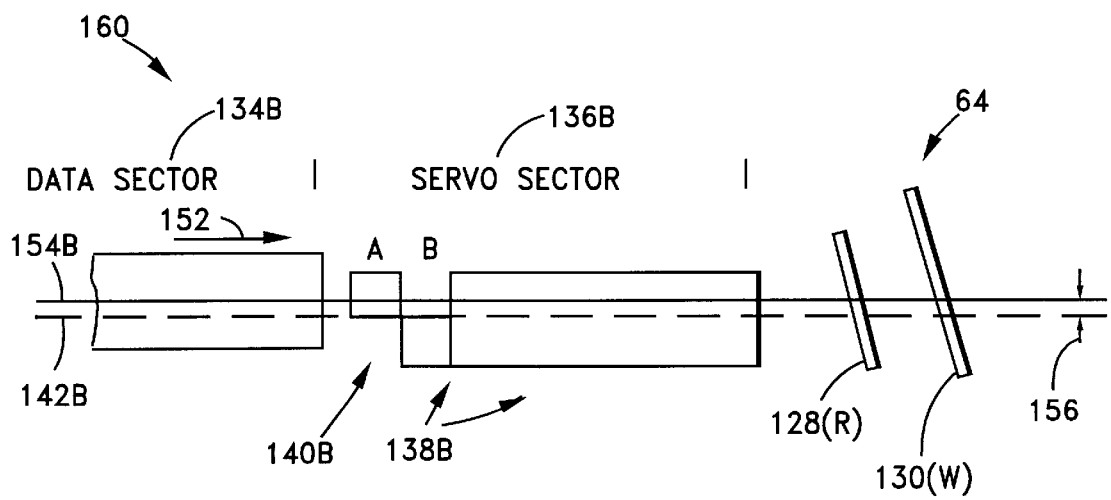
FIG. 11 is an enlarged diagram illustrating one embodiment of the relationship between a dual element head and a data track during the reading of data in the user band on a disk surface.

FIG. 11 is an enlarged diagram illustrating one embodiment of the relationship between the dual element transducer head 64 and data track 160 during the reading of data in the user band 116 on disk surface 52. As shown, read element 128(R) is centered on data track 160 centerline 154B. The offset value which was previously measured during manufacturing, written to the reserved area 118 on the disk surface 52, and transferred into volatile memory on startup is employed to micro-jog the read element 128(R) from the servo track centerline 142B the desired distance to maximize disk drive performance in reading data track 160.

Figure 12:
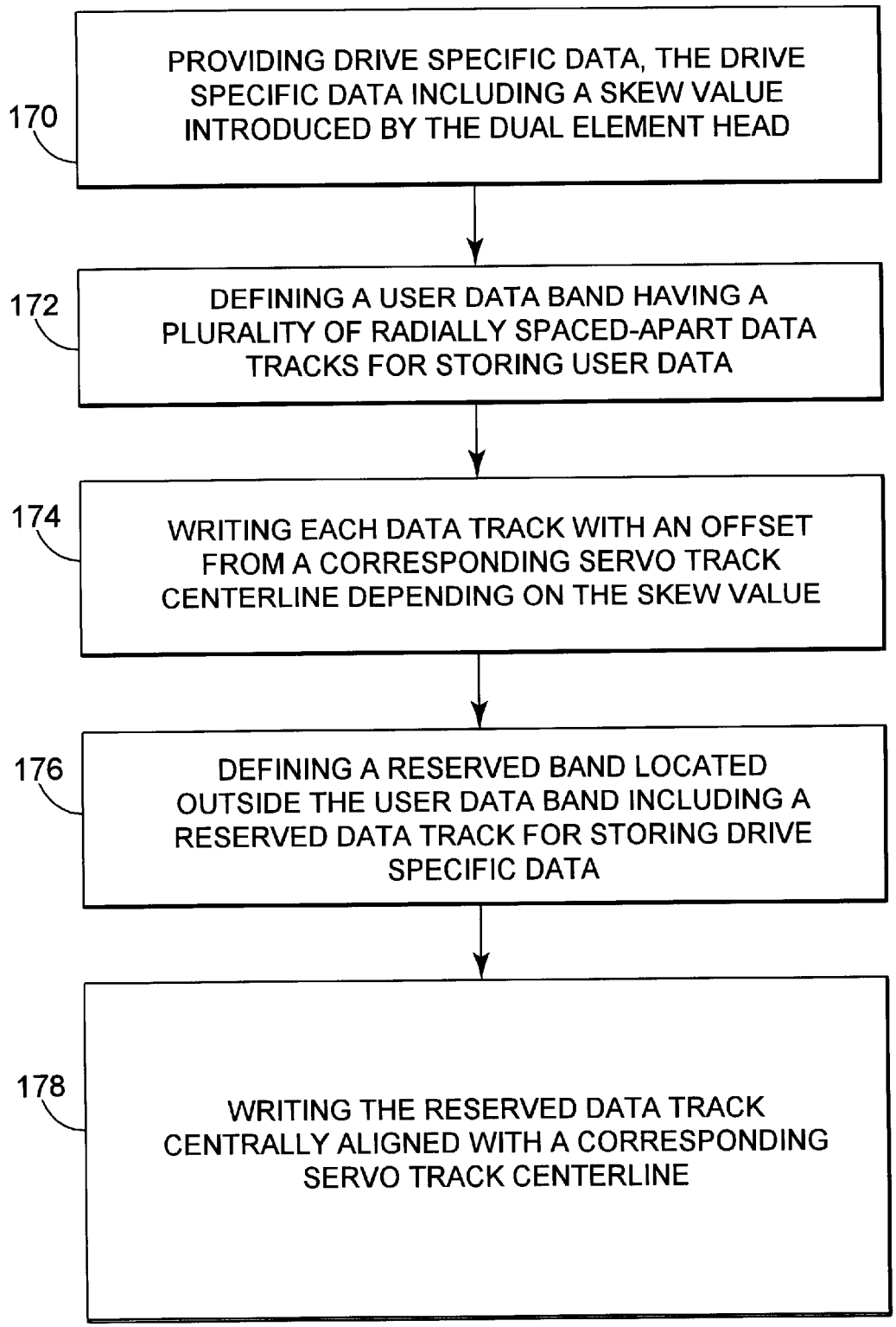
FIG. 12 is a flow chart illustrating one exemplary embodiment of a method for manufacturing a disk drive, including formatting a disk surface having a user data band and a reserved band, in accordance with the present invention.

FIG. 12 is a flow chart illustrating another exemplary embodiment of the present invention including a method of manufacturing a disk drive including formatting a disk surface having a compensating offset between servo and data sectors in the reserved band of the disk surface for improving disk drive performance during initialization, in accordance with the present invention. The disk drive includes a rotary actuator, an embedded servo system for controlling the rotary actuator, a rotating disk surface for recording and reproducing data, and a dual element head supported by the actuator comprising a read element and a write element, as shown in FIGS. 1–3. The method includes the step of formatting the disk surface to have a plurality of repeating servo track patterns defining radially spaced-apart servo tracks. The step of formatting the disk surface further includes a step 170 of providing drive specific data, the drive specific data including a skew value introduced by the dual element head (64). In step 172, a user data band (116) is defined having a plurality of radially spaced-apart data tracks (119) for storing user data. In step 174, each data track (119) is written with an offset from a corresponding servo track centerline (142) depending on the skew value. In step 176 a reserved band (118) is defined, the reserve band (18) being located outside the user data band (116) including a reserved data track (132) for storing drive specific data. In step 178, the reserved data track (132) is written to be centrally aligned with a corresponding servo track centerline (142).

The step of writing the reserved data track (132) to be centrally aligned with a corresponding servo track centerline (142) includes the step of employing the skew value to offset the read element (128(R))from the corresponding servo track centerline (142) such that the write element (130(W)) is substantially centered on the corresponding servo track centerline (142). The step of formatting the disk surface further includes the step of defining a buffer zone (120) between the reserved band (118) and the user data band (116). In one aspect, the step of defining the buffer zone (120) includes the step of providing at least one data track space between the reserved band and the user data band.

The step of writing the reserved data track (132) may further include the step of writing the drive specific data at more than one location within the reserved band (118). The servo track includes a servo pattern having a first servo burst and a second servo burst, wherein the step of formatting the disk surface further includes the step of defining the corresponding servo track centerline (142) by the juncture of the first servo burst and the second servo burst. In one aspect, the offset varies with the location of the data track within the user data band (116).

We claim:

1. A disk drive comprising:
   a rotary actuator;
   an embedded servo system for controlling the rotary actuator;
   a dual element head supported by the actuator, the dual element head comprising a read element and a write element;
   a rotating disk surface for recording and reproducing data;
   a plurality of radially spaced-apart servo tracks disposed on the disk surface;
   a user data band, disposed on the disk surface, having a plurality of radially spaced-apart data tracks for storing user data wherein each data track is offset from a corresponding servo track centerline depending on a skew introduced by the dual element head; and
   a reserved band, located outside the user data band, including a reserved data track for storing drive specific data wherein the reserved data track is centrally aligned with a corresponding servo track centerline;
   wherein the offset is measured during manufacturing and stored in the reserved band and whereby the reserved data track can be read reliably by the read element when the servo system is tracking on the corresponding servo track centerline.

2. The disk drive of claim 1, wherein the disk surface further comprises a buffer zone between the reserved band and the user data band.

3. The disk drive of claim 2, wherein the buffer zone comprises at least one data track.

4. The disk drive of claim 1, wherein drive specific data is stored at more than one location within the reserved data band.

5. The disk drive of claim 1, wherein the servo track includes a servo pattern having a first servo burst and a second servo burst, and wherein the corresponding servo track centerline is defined by the juncture of the first servo burst and the second servo burst.

6. The disk drive of claim 1, further comprising means for employing the offset stored in the reserved band to center the read element on the data track in the user data band during execution of a read command.

7. The disk drive of claim 1, wherein the offset varies with the location of the data track in the user data band.

8. A method for making a disk drive having a rotary actuator, an embedded servo system for controlling the rotary actuator, a rotating disk surface for recording and reproducing data, and a dual element head supported by the actuator comprising a read element and a write element, the method comprising the step of:
   formatting the disk surface to have a plurality of repeating servo track patterns defining radially spaced-apart servo tracks, the step of formatting the disk surface further comprising:
   providing drive specific data, the drive specific data including a skew value introduced by the dual element head;
   defining a user data band having a plurality of radially spaced-apart user data tracks for storing user data;
   writing each user data track with an offset from a corresponding servo track centerline depending on the skew value;
   defining a reserved band located outside the user the data band including a reserved data track for storing drive specific data; and
   writing the reserved data track to be centrally aligned with a corresponding servo track centerline;
   wherein the step of writing the reserved data track aligned with a corresponding servo track centerline includes the step of employing the skew value to offset the read element from the corresponding servo track centerline such that the write element is centered on the corresponding servo track centerline.

9. The method of claim 8, wherein the step of formatting the disk surface further comprises the step of defining a buffer zone between the reserved band and the user data band.

10. The method of claim 9, wherein the step of defining the buffer zone comprises the step of providing at least one data track space between the reserved band and the user data band.

11. The method of claim 8, wherein the step of writing the reserved data track further comprises the step of writing the drive specific data at more than one location within the reserved band.

12. The method of claim 8, wherein the servo track includes a servo pattern having a first servo burst and a second servo burst, and wherein the step of formatting the disk surface further comprises the step of defining the corresponding servo track centerline by the juncture of the first servo burst and the second servo burst.

13. The method of claim 8, wherein the offset varies with the location of the data track in the user data band.

* * * * *